(12) United States Patent
Jang et al.

(10) Patent No.: US 12,506,594 B2
(45) Date of Patent: Dec. 23, 2025

(54) ELECTRONIC DEVICE FOR MANAGING RIGHT BY USING DECENTRALIZED NETWORK, AND OPERATION METHOD THEREOF

(71) Applicant: Samsung Electronics Co., Ltd., Suwon-si (KR)

(72) Inventors: Wooseok Jang, Suwon-si (KR); Seungmin Ha, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 18/185,885

(22) Filed: Mar. 17, 2023

(65) Prior Publication Data

US 2023/0231701 A1    Jul. 20, 2023

Related U.S. Application Data

(63) Continuation of application No. PCT/KR2021/012754, filed on Sep. 17, 2021.

(30) Foreign Application Priority Data

Sep. 18, 2020  (KR) .......... 10-2020-0120805

(51) Int. Cl.
*H04L 9/08* (2006.01)
*H04L 9/32* (2006.01)

(52) U.S. Cl.
CPC .......... *H04L 9/0825* (2013.01); *H04L 9/3247* (2013.01); *H04L 2209/603* (2013.01)

(58) Field of Classification Search
CPC ..... G06Q 20/12; H04L 2209/603; H04L 9/50; H04L 9/3247
See application file for complete search history.

(56) References Cited

U.S. PATENT DOCUMENTS 10,723,582 B2    7/2020  Schoulz
11,258,587 B2    2/2022  Diehl
(Continued)

FOREIGN PATENT DOCUMENTS

JP    2019-75755 A    5/2019
JP    2020-068388 A   4/2020
(Continued)

OTHER PUBLICATIONS

International Search Report dated Dec. 31, 2021, issued in International Patent Application No. PCT/KR2021/012754.

(Continued)

*Primary Examiner* — Olugbenga O Idowu
(74) *Attorney, Agent, or Firm* — Jefferson IP Law, LLP

(57) ABSTRACT

An electronic device is provided. The electronic device includes a communication module, a memory for storing instructions, and a processor, wherein the processor is configured to execute the instructions such that the electronic device identifies owner information of first content in response to a content ownership transfer request, transmits, to a blockchain network, transaction data for transferring the ownership of the first content, on the basis of the owner information of the first content, and transmits the first content to an external electronic device, wherein the transaction data may be regarding a transaction of transferring the ownership of a token related to the first content.

20 Claims, 10 Drawing Sheets

(56) References Cited

U.S. PATENT DOCUMENTS

| | | | |
|---|---|---|---|
| 2016/0321769 A1 | 11/2016 | McCoy et al. | |
| 2018/0322259 A1 | 11/2018 | Solow et al. | |
| 2019/0306549 A1* | 10/2019 | Dietz | ................... H04L 9/50 |
| 2020/0005284 A1 | 1/2020 | Mjayan | |
| 2020/0211011 A1* | 7/2020 | Anderson | ............. G06Q 20/06 |
| 2020/0296093 A1 | 9/2020 | Hoyos | |
| 2021/0067323 A1* | 3/2021 | Dambal | ................ H04L 9/083 |
| 2021/0091934 A1* | 3/2021 | Fletcher | ............... H04L 9/0847 |
| 2021/0133700 A1* | 5/2021 | Williams | ........... G06Q 20/3829 |
| 2021/0150527 A1 | 5/2021 | Ur et al. | |
| 2021/0201310 A1 | 7/2021 | Moss-Pultz et al. | |
| 2021/0390161 A1 | 12/2021 | Nakadaira et al. | |
| 2021/0399877 A1 | 12/2021 | Ohashi et al. | |

FOREIGN PATENT DOCUMENTS

| | | |
|---|---|---|
| JP | 2022-013271 A | 1/2022 |
| KR | 10-2019-0045344 A | 5/2019 |
| KR | 10-1986482 B1 | 6/2019 |
| KR | 10-2034449 B1 | 10/2019 |
| KR | 10-2020-0021123 A | 2/2020 |
| KR | 10-2020-0046260 A | 5/2020 |
| KR | 10-2020-0099041 A | 8/2020 |
| WO | 2020/100855 A | 5/2020 |

OTHER PUBLICATIONS

Korean Office Action dated Mar. 10, 2025, issued in Korean Patent Application No. 10-2020-0120805.

* cited by examiner

ELECTRONIC DEVICE FOR MANAGING RIGHT BY USING DECENTRALIZED NETWORK, AND OPERATION METHOD THEREOF

CROSS-REFERENCE TO RELATED APPLICATION(S)

This application is a continuation application, claiming priority under § 365(c), of an International application No. PCT/KR2021/012754, filed on Sep. 17, 2021, which is based on and claims the benefit of a Korean patent application number 10-2020-0120805, filed on Sep. 18, 2020, in the Korean Intellectual Property Office, the disclosure of which is incorporated by reference herein in its entirety.

BACKGROUND

1. Field

The disclosure relates to an electronic device for managing rights by using a decentralized network, and an operation method thereof.

2. Description of Related Art

A decentralized network is a network distinguished from a centralized network in which decision making is performed by a central server. The decentralized network may refer to a network in which decision making is performed according to a consensus algorithm among nodes participating in the decentralized network.

A distributed ledger may refer to a ledger in which transaction details are recorded and which is divided into multiple nodes and stored.

The distributed ledger existing in the decentralized network may be stored in each of the nodes participating in the decentralized network. The distributed ledger existing in the decentralized network may be updated according to the consensus algorithm among the nodes participating in the decentralized network.

Accordingly, the decentralized network having the distributed ledger is advantageous in that a centralized server is unnecessary. Accordingly, demand for various solutions using the decentralized network having the distributed ledger is increasing.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and an operation method for a solution of managing ownership of a content by using a decentralized network.

Additional aspects will be set forth in part in the description which follows and, in part, will be apparent from the description, or may be learned by practice of the presented embodiments.

In accordance with an aspect of the disclosure, an electronic device is provided. The electronic device includes a communication module, a memory configured to store instructions, and a processor, wherein the processor is configured to execute the instructions to cause the electronic device to identify owner information of a first content in response to a content ownership transfer request, transmit, to a blockchain network, transaction data for transferring ownership of the first content, based on the owner information of the first content, encrypt the first content, based on a public key associated with a blockchain address included in transfer information corresponding to the content ownership transfer request, and transmit the encrypted first content to an external electronic device, and the transaction data corresponds to data relating to a transaction of transferring ownership of a token related to the first content.

In accordance with another aspect of the disclosure, an operation method of an electronic device is provided. The operation method includes identifying owner information of a first content in response to a content ownership transfer request, transmitting, to a blockchain network, transaction data for transferring ownership of the first content, based on the owner information of the first content, encrypting the first content, based on a public key associated with a blockchain address included in transfer information corresponding to the content ownership transfer request, and transmitting the encrypted first content to an external electronic device, wherein the transaction data corresponds to data relating to a transaction of transferring ownership of a token related to the first content.

An electronic device and an operation method thereof according to an embodiment of the disclosure may manage ownership of a content by using a decentralized network.

Advantageous effects which may be acquired from the disclosure are not limited to the above-mentioned advantageous effect, and other unmentioned advantageous effects may be clearly understood from the description below by those skilled in the art to which the disclosure belongs.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
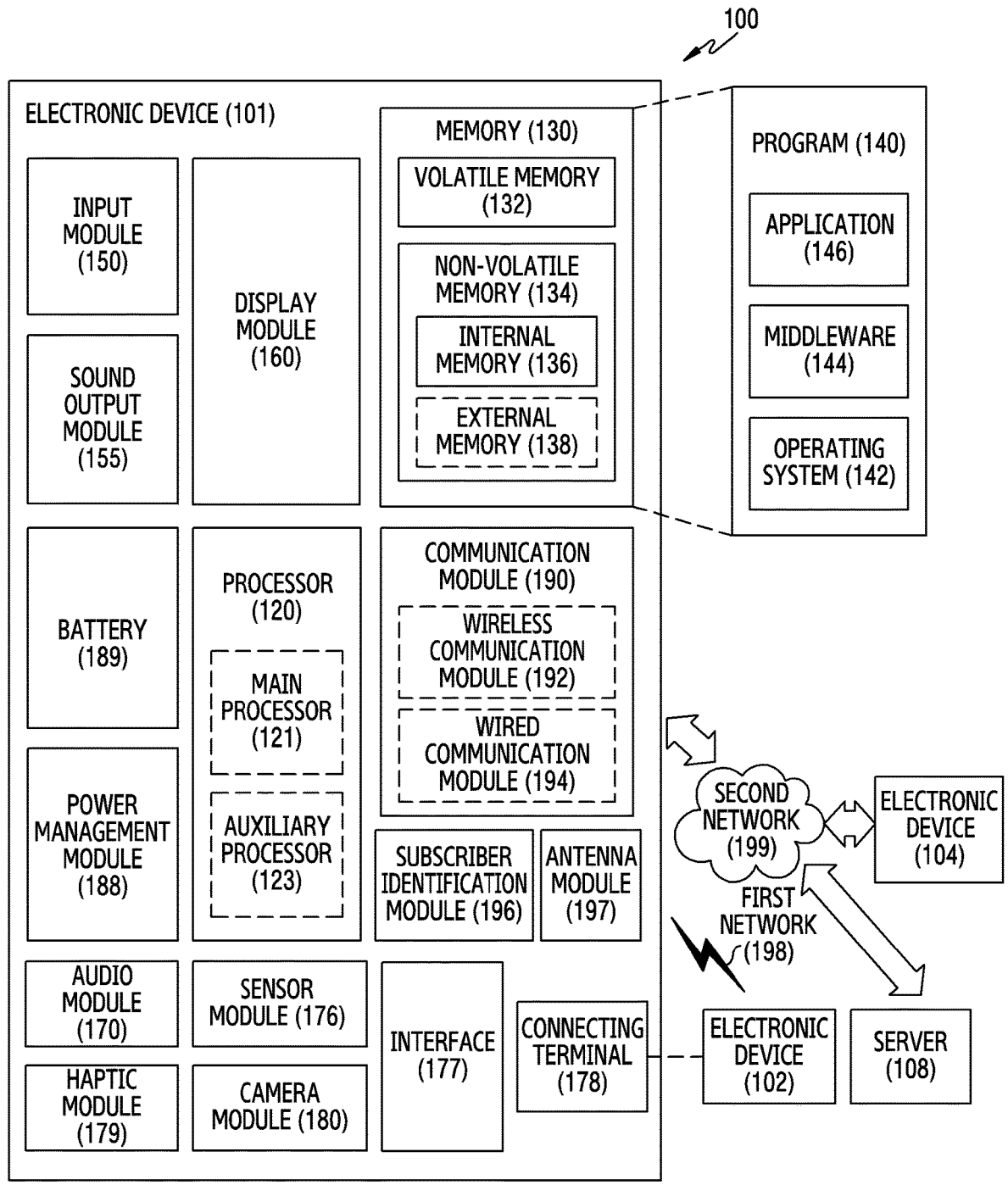
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to yet another embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to yet another embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to yet another embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to yet another embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to yet another embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to yet another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to yet another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to yet another embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to yet another embodiment, the haptic module 179 may include, for example, a motor, a piezoelectric element, or an electric stimulator.

The camera module 180 may capture a still image or moving images. According to yet another embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to yet another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to yet another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to yet another embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to yet another embodiment, all or some of operations to be executed at the electronic device 101 may be executed at one or more of the external electronic devices 102, or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
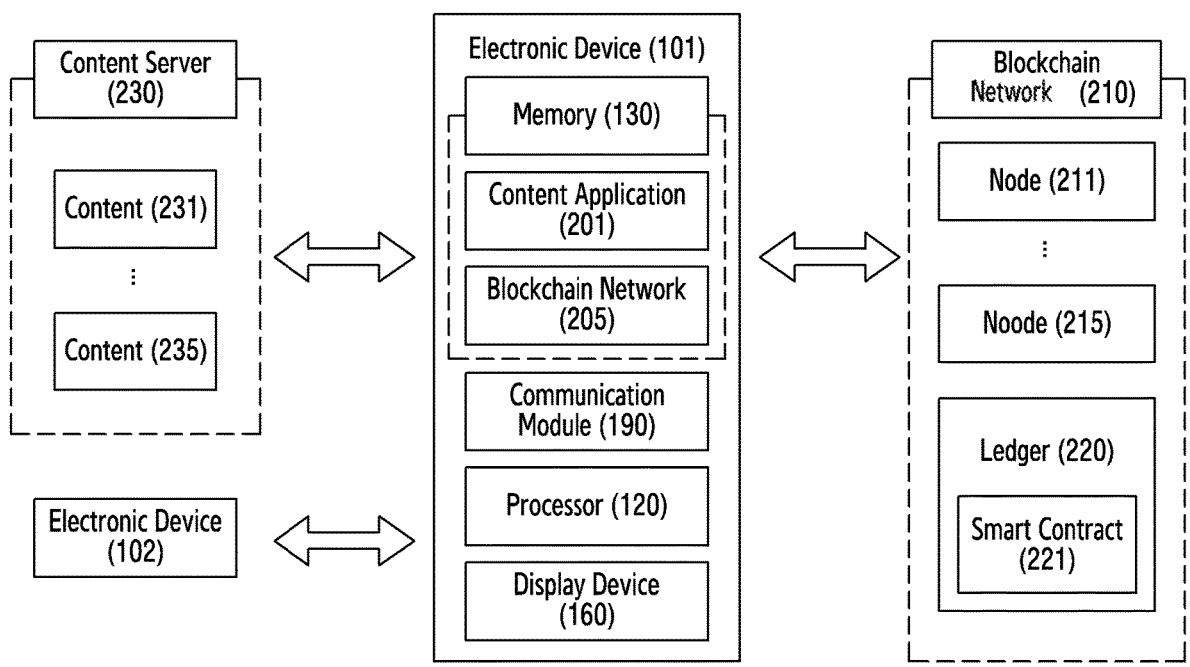
FIG. 2 is a block diagram illustrating an electronic device according to an embodiment of the disclosure.

FIG. 2 is a block diagram illustrating an electronic device according to an embodiment of the disclosure.

In an embodiment, the electronic device 101 of FIG. 2 may corresponds to the electronic device 101 of FIG. 1. In an embodiment, each of nodes 211 and 215 constituting a blockchain network 210 of FIG. 2 may correspond to the electronic device 104 of FIG. 1. In an embodiment, a content server 230 of FIG. 2 may correspond to the server 108 of FIG. 1.

In yet another embodiment, the blockchain network 210 (e.g., a Bitcoin network or an Ethereum network) may include the nodes 211 and 215 and a ledger 220. In yet another embodiment, the blockchain network 210 may be a network in which the nodes 211 and 215 are connected to each other in a peer-to-peer (P2P) scheme. In yet another embodiment, the blockchain network 210 may be a network in which each of the nodes 211 and 215 stores the ledger 220. Each of the nodes 211 and 215 constituting the blockchain network 210 may include a device for processing data and performing communication with another node. For example, each of the nodes 211 and 215 includes at least one of a personal computer (PC), a server, a fifth generation (5G) mobile edge computing (MEC) server, or a mobile device. In yet another embodiment, the blockchain network 210 may be also referred to as a decentralized network.

In yet another embodiment, the nodes 211 and 215 may generate blocks including transaction data of transactions through a consensus algorithm (e.g., proof of work (PoW) and proof of stake (PoS)). In yet another embodiment, the transaction data may be data generated by an external device (e.g., the electronic device 101 and the content server 230), the nodes 211 and 215, or a combination thereof. In yet another embodiment, the transaction data may be data for recording the contents of a normally generated transaction in the ledger 220. For example, the transaction data includes data indicating the details of a transaction between accounts. The transaction may mean an action which generates a change in the contents of the ledger 220. Transaction data for which a signature has been normally completed may be recorded in the ledger 220, and transaction data for which a signature has not been normally completed may not be recorded in the ledger 220. Whether the transaction data is recorded in a block by the transaction may be tracked through a transaction identity (ID). In yet another embodiment, the transaction data may be recorded in the ledger 220 by using a smart contract (e.g., a smart contract 221).

In yet another embodiment, the nodes 211 and 215 may transmit data included in the ledger 220 to the outside, based on a request from the external device (e.g., the electronic device 101 or the content server 230). In yet another embodiment, the nodes 211 and 215 may execute the smart contract 221, based on the request from the external device (e.g., the electronic device 101 or the content server 230), and transmit data indicating a result of the execution of the smart contract 221 to the outside.

In yet another embodiment, the ledger 220 may be chain-type data in which a block including transaction data of at least one transaction refers to a previous block including transaction data of another transaction. In yet another embodiment, at least a part of the ledger 220 may be stored in each of the nodes 211 and 215.

In yet another embodiment, the smart contract 221 may be a smart contract for a designated token. In yet another embodiment, the smart contract 221 may be a smart contract for a non-fungible token (NFT) (e.g., an Ethereum request for comment 721 (ERC 721)-based token). In yet another embodiment, a token may indicate an asset which can be traded through the smart contract 221 of the blockchain network 210. In yet another embodiment, the non-fungible token (NFT) may be a token having a unique value.

In yet another embodiment, the smart contract 221 may manage owner information, transfer information, or transaction details of each non-fungible token (NFT), or a combination thereof. In yet another embodiment, non-fungible token (NFT) information managed by the smart contract 221 may be as shown in Table 1 below.

TABLE 1

| Token identity | Content identity | Owner identity | Type |
| --- | --- | --- | --- |
| 187013263756 | 100 | 0x0bbe . . . | Electronic book |
| 170412845122 | 100 | 0xab88 . . . | Electronic book |
| 575114489542 | 200 | 0xab88 . . . | Electronic book |
| 145789212645 | 300 | 0x845b . . . | Electronic book |
| 157898544234 | 400 | 0xff34 . . . | Electronic book |

Referring to Table 1, for a token having a token identity corresponding to "187013263756", a content identity may be "100", an owner identity may be "0x0bbe . . . ", and a content type may be an electronic book. Referring to Table 1, for a token having a token identity corresponding to "170412845122", a content identity may be "100", an owner identity may be "0xab88 . . . ", and a content type may be an electronic book.

Referring to Table 1, even though multiple contents correspond to the same content (e.g., a content having a content identity corresponding to "100"), the respective multiple contents have different unique token identities from each other. The respective multiple contents have different unique token identities from each other, and thus each of the multiple contents may be evaluated as a unique content.

In yet another embodiment, the content server 230 may provide at least one content 231 or 235 to an external device (e.g., the electronic device 101). In yet another embodiment, the content server 230 may provide a content (e.g., the content 231) purchased by the external device (e.g., the electronic device 101) through a payment procedure to the external device (e.g., the electronic device 101).

In yet another embodiment, the content 231 or 235 may be a content which may be used by the external device (e.g., the electronic device 101). In yet another embodiment, the content 231 or 235 may include an electronic book, an image, audio, a video, an application, or a combination thereof.

In yet another embodiment, when ownership of the content (e.g., the content 231) is transferred from the content server 230 to the external device (e.g., the electronic device 101), information (e.g., owner information) of a non-fungible token (NFT) related to the content (e.g., the content 231) may be updated. In yet another embodiment, during the transfer of the ownership of the content (e.g., the content 231), transaction data for updating of the information (e.g., owner information) of the non-fungible token (NFT) related to the content (e.g., the content 231) may be generated.

In yet another embodiment, the electronic device 101 may include a processor 120, a memory 130, a display device 160, a communication module 190, and a combination thereof. In yet another embodiment, the processor 120, the memory 130, the display device 160, and the communication module 190 of FIG. 2 may correspond to the processor 120, the memory 130, the display device 160, and the communication module 190 of FIG. 1, respectively.

1. Content Purchase

In yet another embodiment, the processor 120 of the electronic device 101 may proceed with payment with the content server 230 by using the communication module 190. In yet another embodiment, the processor 120 may proceed with payment with the content server 230 through a content application 201. In an embodiment, the processor 120 may proceed with payment for at least one content (e.g., the content 231) of the contents 231 and 235 with the content server 230. In yet another embodiment, the content application 201 may be an application for purchasing, using, managing, or reselling a content which may be used by the electronic device 101. In yet another embodiment, the content application 201 may be an application for reproduction of the content.

In yet another embodiment, the processor 120 may identify an identity (ID) of a token related to the content 231. In yet another embodiment, the processor 120 may identify the identity (ID) of the token related to the content 231 while proceeding with the payment for the content 231.

In yet another embodiment, the processor 120 may identify the identity (ID) of the token related to the content 231, based on information acquired from the content server 230. In yet another embodiment, the token related to the content 231 may be a non-fungible token (NFT).

In yet another embodiment, the processor 120 may identify an identity (ID) of a purchaser (e.g., a user of the electronic device 101). In yet another embodiment, the processor 120 may identify the identity (ID) of the purchaser while proceeding with payment for the content 231. In yet another embodiment, the identity (ID) of the purchaser may be an address of the blockchain network 210 related to the token.

In an embodiment, the processor 120 may identify the identity (ID) of the purchaser through a blockchain application 205.

In yet another embodiment, the processor 120 may transmit transaction data related to purchase of the content 231 to the blockchain network 210. In an embodiment, as the transaction data related to the purchase of the content 231, an identity (ID) of the token related to the content 231, an identity (ID) of a seller (the content server 230), and an identity (ID) of a purchaser (a user of the electronic device 101) may be recorded. In an embodiment, as the transaction data related to the purchase of the content 231, an identity (ID) (e.g., an address) of the smart contract 221 related to the content 231 may be recorded.

In yet another embodiment, the processor 120 may make a signature on the transaction data related to the purchase of the content 231, and transmit the signed transaction data to the blockchain network 210. In an embodiment, the processor 120 may make a signature on the transaction data, based on a secret key (or a private key) related to the identity (ID) of the purchaser.

In yet another embodiment, the signed transaction may be recorded in the ledger 220 of the blockchain network 210.

In yet another embodiment, the processor 120 may receive the content 231 from the content server 230 through the communication module 190. In an embodiment, the processor 120 may receive the content 231 from the content server 230 through the content application 201.

In yet another embodiment, the content 231 may be provided to the electronic device 101 from the content server 230 after the signed transaction data is recorded in the ledger 220 of the blockchain network 210. In an embodiment, the content 231 may be provided to the electronic device 101 immediately after the payment by the electronic device 101 is completed.

The description has been made that during the purchase of the content 231, the electronic device 101 transmits the transaction data related to the purchase for the content 231 to the blockchain network 210, but this is merely provided as an example. In an embodiment, the transaction data related to the purchase of the content 231 may be transmitted to the blockchain network 210 by the content server 230. In this case, the electronic device 101 may provide the content server 230 with the identity (ID) of the purchaser. In this case, the content server 230 may transmit transaction data in which the identity (ID) of the token related to the content 231 and the identity (ID) of the purchaser are recorded to the blockchain network 210. In this case, the content server 230 may make a signature on the transaction data related to the purchase of the content 231, and transmit the signed transaction data to the blockchain network 210. In this case, the content server 230 may make a signature on the transaction data, based on a secret key related to the identity (ID) of the seller.

2. Content Provision

In yet another embodiment, the processor 120 may identify a first input. In an embodiment, the processor 120 may identify a first input of requesting a content list. In an embodiment, the processor 120 may identify the first input through the blockchain application 205. In an embodiment, the processor 120 may identify the first input through a user interface (UI) related to the blockchain application 205.

In yet another embodiment, the processor 120 may request a content list from the blockchain network 210. In an embodiment, the processor 120 may request a content list from the blockchain network 210 through the blockchain application 205. In an embodiment, the processor 120 may request the content list from the blockchain network 210 by using the communication module 190. In an embodiment, the processor 120 may request the content list from the blockchain network 210 in response to the first input. In an embodiment, the content list may be a list including contents of non-fungible tokens owned by a user.

In yet another embodiment, the processor 120 may transmit a content list request including an identity (ID) of the user to the blockchain network 210.

In yet another embodiment, the processor 120 may acquire the content list from the blockchain network 210. In an embodiment, the processor 120 may acquire a list of contents of the user, identified from the ledger 220 of the blockchain network 210. In an embodiment, the content list may include information on an identity (ID) of a content, an identity (ID) of a token related to the content, or a combination thereof.

In yet another embodiment, the processor 120 may display the content list through the display device 160 (e.g., a display). In an embodiment, the processor 120 may display the content list through the user interface (UI) related to the blockchain application 205.

In yet another embodiment, the processor 120 may identify a second input. In an embodiment, the processor 120 may identify a second input of selecting a content (e.g., the content 231). In an embodiment, the processor 120 may identify the second input through the blockchain application 205. In an embodiment, the processor 120 may identify the second input through a user interface (UI) related to the blockchain application 205.

In yet another embodiment, the processor 120 may request a content from an application (e.g., the content application 201) corresponding to the selected content 231. In an embodiment, the processor 120 may request the selected content 231 from the content application 201 through the blockchain application 205. In an embodiment, the content request may include information on an identity (ID) of a user, an identity (ID) of a token related to a content, or a combination thereof.

In yet another embodiment, the processor 120 may request to identify an owner of a token related to the content 231, from the blockchain network 210. In an embodiment, the processor 120 may request to identify the owner of the token related to the content 231, from the blockchain network 210 through the content application 201.

In yet another embodiment, the processor 120 may acquire a result of the identification of the owner of the token related to the content 231 from the blockchain network 210. In an embodiment, the processor 120 may acquire, from the blockchain network 210, information on a user of the token related to the content 231, identified from ledger 220 of the blockchain network 210.

In yet another embodiment, the processor 120 may identify whether the owner of the token related to the content 231 is a user. In an embodiment, the processor 120 may request to prove ownership of the token related to the content 231 from the blockchain network 210. In an embodiment, the processor 120 may request to prove the ownership of the token related to the content 231 from the blockchain application 205 through the content application 201. In an embodiment, the request to prove the ownership may include a request to make a signature on a designated character string.

In yet another embodiment, the processor 120 may prove the ownership of the token related to the content 231.

In yet another embodiment, the processor 120 may make a signature on the designated character string through a secret key of a user in response to the request to prove the ownership. In an embodiment, the processor 120 may make a signature on the designated character string by using the secret key of the user through the blockchain application 205. In an embodiment, the processor 120 may make a signature on the designated character string by using the secret key of the user through a designated instruction (e.g., an application programming interface (API)). In an embodiment, the designated instruction may be personal.sign( ). In an embodiment, the designated character string, the secret key of a user, or a combination thereof may be input to personal.sign( ), as a factor.

In yet another embodiment, in response to the signature request, the processor 120 may provide a signed character string. In an embodiment, the processor 120 may provide the content application 201 with the signed character string through the blockchain application 205.

In yet another embodiment, the processor 120 may identify whether the owner of the token related to the content 231 is a user, based on the signed character string. In an embodiment, the processor 120 may verify the signed character string through a public key of the user so as to identify whether the owner of the token related to the content 231 is the user. In an embodiment, the processor 120 may identify whether the owner of the token related to the content 231, based on the signed character string through the content application 201. In an embodiment, the processor 120 may decrypt the signed character string, based on the public key of the user, and compare the decrypted character string with the designated character string, so as to identify whether the owner of the token related to the content 231 is the user.

In yet another embodiment, when the owner of the token related to the content 231 is the user, the processor 120 may provide the user with the content 231. In an embodiment, when the content 231 is an electronic book, an image, or a video, the processor 120 may provide the user with the content 231 through the display device 160. In an embodiment, when the content 231 is a sound source, the processor 120 may provide the user with the content 231 through the audio module 170.

In yet another embodiment, the processor 120 may encrypt the content 231 through the content application 201. In an embodiment, the processor 120 may encrypt the content 231 through the public key of the user. In an embodiment, the processor 120 may provide the blockchain application 205 with the encrypted content 231. In an embodiment, the processor 120 may decrypt the encrypted content 231 by using the secret key of the user through the blockchain application 205. In an embodiment, the processor 120 may provide the user with the decrypted content 231.

It is illustrated that when the content is provided, the content 231 is encrypted through the content application 201, but it is merely provided as an example. In an embodiment, the content 231 in the encrypted state may be received in the electronic device 101 from the content server 230. In this case, the content application 201 may provide the blockchain application 205 with the encrypted content 231.

It is illustrated that when the content is provided, the owner of the token related to the content 231 is identified, but it is merely provided as an example. In an embodiment, a procedure of identifying the owner of the token related to the content 231 may be omitted. In an embodiment, when the content is selected, the electronic device 101 may perform the procedure of proving ownership of the token related to the content 231.

It is illustrated that when the content is provided, the ownership of the token related to the content 231 is proved, but it is merely provided as an example. In an embodiment, a procedure of proving the ownership of the token related to the content 231 may be omitted. In an embodiment, when the owner of the token related to the content 231 is identified, the electronic device 101 may provide the blockchain application 205 with the encrypted content 231.

It is illustrated that when the content is provided, the owner of the token related to the content 231 is identified and the ownership of the token related to the content 231 is proved, but it is merely provided as an example. In an embodiment, a procedure of identifying the owner of the token related to the content 231 and a procedure of proving the ownership of the token related to the content 231 may be omitted. In an embodiment, when the content is selected, the electronic device 101 may provide the blockchain application 205 with the encrypted content 231.

3. Content Transfer

In yet another embodiment, the processor 120 may identify a third input. In an embodiment, the processor 120 may identify a third input of requesting ownership transfer of a content (e.g., the content 231). In an embodiment, the processor 120 may identify the third input through the blockchain application 205. In an embodiment, the processor 120 may identify the third input through a user interface (UI) related to the blockchain application 205.

In yet another embodiment, the processor 120 may notify the ownership transfer of the content 231. In an embodiment, the processor 120 may broadcast (e.g., intent) the ownership transfer of the content 231. In an embodiment, the processor 120 may notify the ownership transfer of the content 231 to the content application 201 through the blockchain application 205.

In yet another embodiment, the processor 120 may identify information related to the ownership transfer of the content 231. In an embodiment, the information related to the ownership transfer of the content 231 may include information (e.g., an identity and a public key of a transferee) on a transferee of the content 231, information (e.g., an identity of a token related to the content 231 and an identity of the content 231), or a combination thereof.

In yet another embodiment, the processor 120 may request the information related to the ownership transfer of the content 231 from the blockchain application 205 through the content application 201. In an embodiment, the processor 120 may acquire the information related to the ownership transfer of the content 231 from the blockchain application 205 in response to the request for the information related to the ownership transfer. In an embodiment, the processor 120 may acquire the information related to the ownership transfer of the content 231 signed by the blockchain application 205, based on a secret key of a user.

In yet another embodiment, the processor 120 may identify ownership information of the content 231.

In yet another embodiment, the processor 120 may identify the ownership information of the content 231, based on a value obtained by decrypting the information related to the ownership transfer of the signed content 231, based on the public key of the user.

In yet another embodiment, the processor 120 may identify the ownership information of the content 231 through a procedure of identifying an owner of the token related to the content 231 and a procedure of proving ownership of the token related to the content 231.

In yet another embodiment, the processor 120 may transmit transaction data related to the ownership transfer of the content 231 to the blockchain network 210. In an embodiment, in the transaction data related to the ownership transfer of the content 231, an identity (ID) of the token related to the content 231, an identity (ID) of a transferor, and an identity (ID) of a transferee may be recorded. In an embodiment, in the transaction data related to the ownership transfer of the content 231, an identity (ID) (e.g., an address) of the smart contract 221 related to the content 231 may be recorded.

In yet another embodiment, the processor 120 may make a signature on the transaction data related to the ownership transfer of the content 231, and transmit the signed transaction data to the blockchain network 210. In an embodiment, the processor 120 may make a signature on the transaction data, based on a secret key related to an identity (ID) of a purchaser.

In yet another embodiment, the signed transaction data may be recorded in the ledger 220 of the blockchain network 210.

In an embodiment, the processor 120 may transmit the content 231 to an electronic device 102 through the communication module 190. In an embodiment, the processor 120 may transmit the content 231 to the electronic device 102 through the content application 201.

In an embodiment, the processor 120 may encrypt the content 231, based on a public key of a user of the electronic device 102. In an embodiment, the processor 120 may transmit the encrypted content 231 to the electronic device 102.

In yet another embodiment, the processor 120 may decrypt, based on the private key of the user of the electronic device 101, the content 231 encrypted based on the public key of the user of the electronic device 101. In an embodiment, the processor 120 may encrypt the decrypted content 231, based on the public key of the user of the electronic device 102. In an embodiment, the processor 120 may transit the encrypted content 231 to the electronic device 102. In an embodiment, the encryption of the content 231 may be performed through the content application 201. In an embodiment, the decryption of the content 231 may be performed through the blockchain application 205.

In yet another embodiment, the content 231 may be provided from the electronic device 101 to the electronic device 102 after the signed transaction data is recorded in the ledger 220 of the blockchain network 210.

In yet another embodiment, the processor 120 may provide the content 231 to the electronic device 102 and then delete the content 231 stored in the memory 130.

Figure 3:
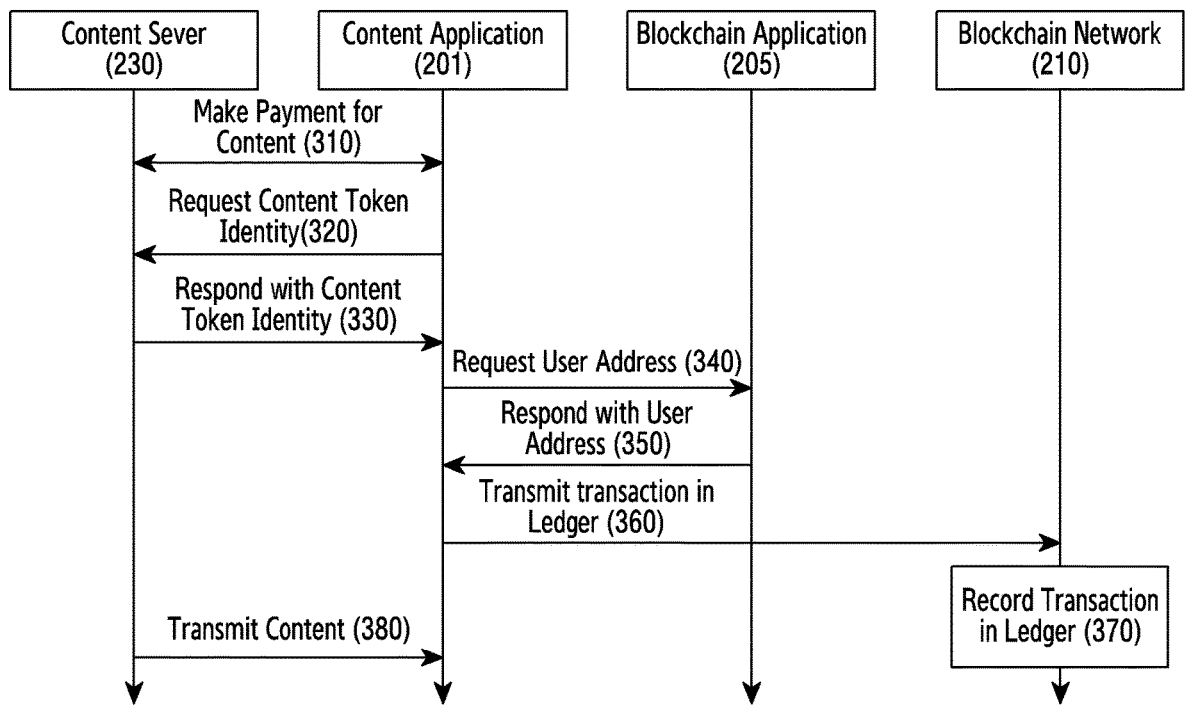
FIG. 3 is a flow chart illustrating a content purchase operation of an electronic device according to an embodiment of the disclosure.

FIG. 3 is a flow chart illustrating a content purchase operation of an electronic device 101 according to an embodiment of the disclosure. Operations of FIG. 3 may be described with reference to the elements of FIG. 1 or 2.

Referring to FIG. 3, in operation 310, the content application 201 may proceed with payment with the content server 230. In an embodiment, the content application 201 may proceed with payment for purchasing the content 231.

Referring to FIG. 3, in operation 320, the content application 201 may request an identity of a token related to the content 231 from the content server 230. In an embodiment, the token related to the content 231 may be a non-fungible token (NFT).

Referring to FIG. 3, in operation 330, the content server 230 may respond to the content application 201 with the identity of the token related to the content 231 in response to the request for the identity of the token related to the content 231.

Referring to FIG. 3, in operation 340, the blockchain application 205 may request a user address from the blockchain application 205. In yet another embodiment, the user address may be a user address on the blockchain network 210.

Referring to FIG. 3, in operation 350, the blockchain network 210 may respond to the blockchain application 205 with the user address in response to the user address request.

Referring to FIG. 3, in operation 360, the content application 201 may transmit transaction data to the blockchain network 210. In yet another embodiment, the content application 201 may transfer a transaction request to the blockchain application 205 to transmit the transaction data to the blockchain network 210. The blockchain application may transmit the transaction data to the blockchain network 210 in response to the transaction request. In yet another embodiment, the content application 201 may make a signature on the transaction data through the blockchain application 205, and transmit the signed transaction data to the blockchain network 210. In an embodiment, the content application 201 may make a signature on the transaction data, based on a secret key (or a private key) related to an identity (ID) of a purchaser through the blockchain application 205, and transmit the signed transaction data to the blockchain network 210. In an embodiment, in the transaction data, an identity (ID) of a token related to the content 231, an identity (ID) of a seller (the content server 230), and an identity (ID) of a purchaser (a user of the electronic device 101) may be recorded. In yet another embodiment, in the transaction data, an identity (ID) of the smart contract 221 related to the content 231 may be recorded.

Referring to FIG. 3, in operation 370, the blockchain network 210 may record a transaction in the ledger 220, based on the transaction data. In yet another embodiment, the nodes 211 and 215 of the blockchain network 210 may record the transaction data in the ledger 220.

Referring to FIG. 3, in operation 380, the content server 230 may transmit the content 231 to the content application 201. In yet another embodiment, the content 231 may be a content encrypted based on a public key of a user. According to an embodiment, the public key of the user may be associated with a blockchain address used in the blockchain network 210.

The content server 230 according to various embodiments may acquire a public key by using a blockchain address. For example, the content server 230 allows the content application 201 to acquire the stored public key through the blockchain application 205. In another example, the content server 230 acquires the public key stored in the blockchain address (blockchain account) of the blockchain network 210 from the blockchain network 210 by using an application program interface (API) provide by the blockchain network 210. In another example, the content server 230 searches the blockchain network 210 for a transaction performed based on the blockchain address (blockchain account) of the user. The content server 230 may acquire the public key recorded in the transaction data for the found transaction. According to yet another embodiment, at least one of a public key of the seller and a public key of the purchaser may be acquired based on the above-described scheme.

Figure 4:
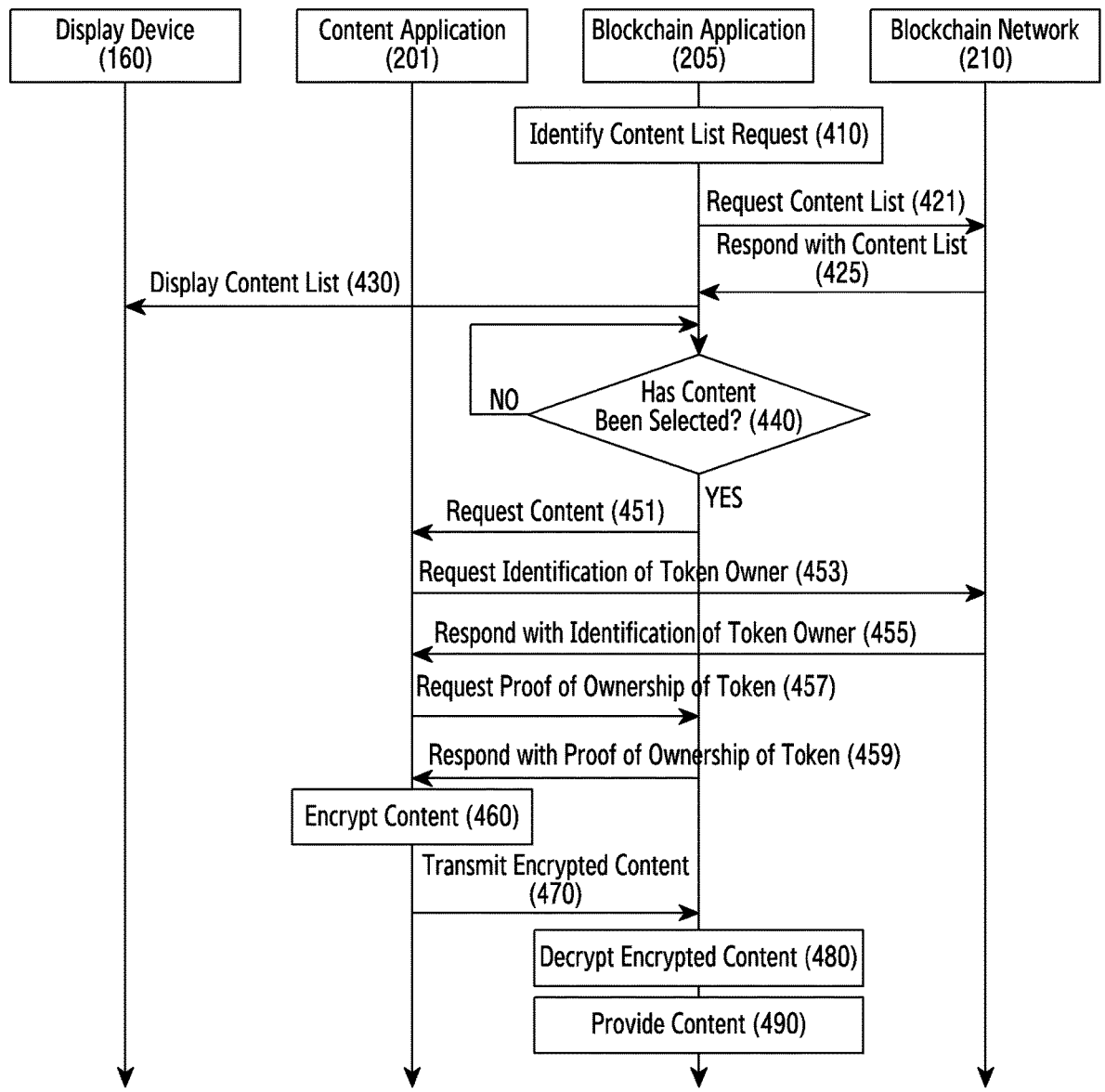
FIG. 4 is a flow chart illustrating a content provision operation of an electronic device according to an embodiment of the disclosure.

FIG. 4 is a flow chart illustrating a content provision operation of an electronic device according to an embodiment of the disclosure. Operations of FIG. 4 may be described with reference to the elements of FIG. 1 or 2.

Referring to FIG. 4, in operation 410, the blockchain application 205 may identify a content list request. In an embodiment, the blockchain application 205 may identify a content list request through a user interface (UI) related to the blockchain application 205.

Referring to FIG. 4, in operation 421, the blockchain application 205 may request a content list from the blockchain network 210. In another embodiment, the blockchain application 205 may transmit a content list request including an identity (ID) of a user to the blockchain network 210. For example, the blockchain application 205 generates transaction data for executing a smart contract (e.g., the smart contract 221 of FIG. 2) for managing a content list recorded in the blockchain network 210. The blockchain application 205 may transmit the transaction data for executing the smart contract to the blockchain network 210 to request the content list. In an embodiment, the content list may be a list including contents of non-fungible tokens that are owned by the user.

Referring to FIG. 4, in operation 425, the blockchain network 210 may respond to the blockchain application 205 with the content list in response to the content list request. In yet another embodiment, nodes 211 and 215 of the blockchain network 210 may respond to the blockchain application 205 with the content list in response to the content list request.

Referring to FIG. 4, in operation 430, the blockchain application 205 may display the content list by using the display device 160. In yet another embodiment, the blockchain application 205 may allow the electronic device 101 to display the content list within the user interface (UI) related to the blockchain application 205 through the display device 160.

Referring to FIG. 4, in operation 440, the blockchain application 205 may identify whether a content has been selected. In yet another embodiment, the blockchain application 205 may identify whether a content has been selected based on an input (e.g., an input through the user interface). In an embodiment, the blockchain application 205 may identify whether at least one of contents of the content list has been selected.

Referring to FIG. 4, in operation 440, when it is identified that the content has been selected, the blockchain application 205 may perform operation 451. Referring to FIG. 4, in operation 440, when it is identified that the content has not been identified, the blockchain application 205 may perform operation 440 again.

Referring to FIG. 4, in operation 451, the blockchain application 205 may request the content 231 from the content application 201. In yet another embodiment, the content request may include information on an identity (ID) of a user, an identity (ID) of the content 231, an identity (ID) of a token related to the content 231, or a combination thereof.

Referring to FIG. 4, in operation 453, when receiving the content request, the content application 201 may request identification of an owner of a token related to the content 231 from the blockchain network 210. For example, an execution screen of the content application 201, including a graphical user interface enabling selection of a token, outputs through the display device 160. The electronic device 101 may receive a user input of selecting the token by using the displayed graphical user interface. In response to the user input, the content application 201 may acquire a blockchain address for a content owned by the user through the blockchain application 205, and access the blockchain network 210, based on the acquired blockchain address.

Referring to FIG. 4, in operation 455, the blockchain network 210 may respond to the content application 201 with the identification of the user of the token in response to the request for the identification of the owner of the token. In yet another embodiment, the blockchain network 210 may transmit a result of the identification of the owner of the token related to the content 231 to the content application 201.

In yet another embodiment, referring to Table 1, when an identity of the token for which the identification of the owners is requested is "187013263756", the blockchain network 210 may provide the content application 201 with information indicating that a content identity is "100", an owner identity is "0x0bbe . . . ", and a content type is an electronic book.

Referring to FIG. 4, in operation 457, the content application 201 may request to prove ownership of the token related to the content 231 from the blockchain application 205. In an embodiment, the ownership proof request may include a signature request for a designated character string. In an embodiment, the signature request may include information on an identity of a token, a content identity, an owner identity, or a combination thereof. For example, the content application 201 generate a random character string, or transfer a designated character string to the blockchain application 205.

Referring to FIG. 4, in operation 459, the blockchain application 205 may respond to the ownership proof request to the content application 201. For example, the blockchain application 205 performs signature on a character string received from the content application 201, by using a private key, and return the received character string together with a signature value acquired as a result of the performed signature to the content application 201.

In yet another embodiment, the blockchain application 205 may make a signature on the designated character string through a secret key of a user in response to the ownership proof request, and provide a result of the signature to the content application 201. In an embodiment, the blockchain application 205 may make a signature on the designated character string through a designated instruction (e.g., an application programming interface (API)) by using a secret key of a user, and provide a result of the signature to the content application 201. In an embodiment, the designated instruction may be personal.sign( ). In an embodiment, the designated character string, the secret of the user, or a combination thereof may be input to personal.sign( ), as a factor.

Referring to FIG. 4, in operation 460, the content application 201 may encrypt the content 231. In yet another embodiment, the content application 201 may encrypt the content 231 by using a public key associated with a blockchain address of a user or a user group. The public key associated with the blockchain address may be generated using a root seed. The root seed may mean a value which is a base for generating multiple keys or addresses from a single value. For example, the root seed generates a master private key and a master chain code from a hash value generated through a hashed message authentication code-secure hash algorithm (HMAC-SHA) 512 algorithm function. Among the 512-bit hashed values, 256 bits on the left may be used as a private key, and 256 bits on the right may be used as a chain code. The public key may be acquired from the private key by using, for example, an elliptic curve function. The blockchain address may be generated by hashing the public key. In an embodiment, the content application 201 may encrypt the content 231, based on a token ownership proof response of the blockchain application 205. In an embodiment, the encryption of the content 231 may be also performed in the content server 230.

In yet another embodiment, the content application 201 may encrypt the content 231 when the owner of the token related to the content 231 is identified as a user. In an embodiment, the content application 201 may verify the signed character string through the public key of the user to encrypt the content 231 when the owner of the token related to the content 231 is identified as a user.

Referring to FIG. 4, in operation 470, the content application 201 may transmit the encrypted content 231 to the blockchain application 205.

Referring to FIG. 4, in operation 480, the blockchain application 205 may decrypt the encrypted content 231 by using the secret key of the user.

Referring to FIG. 4, in operation 490, the blockchain application 205 may provide the user with the decrypted content 231.

In yet another embodiment, when the content 231 is an electronic book, an image, or a video, the blockchain application 205 may provide the user with the content 231 through the display device 160. In an embodiment, when the content 231 is a sound source, the blockchain application 205 may provide the user with the content 231 through the audio module 170.

In an embodiment, when the content 231 is an application, the blockchain application 205 may allow the user to perform log-in or install the application through a process of authenticating whether the user is a user having an authority to use the application through the blockchain application 205, and provide the user with the content 231.

Figure 5:
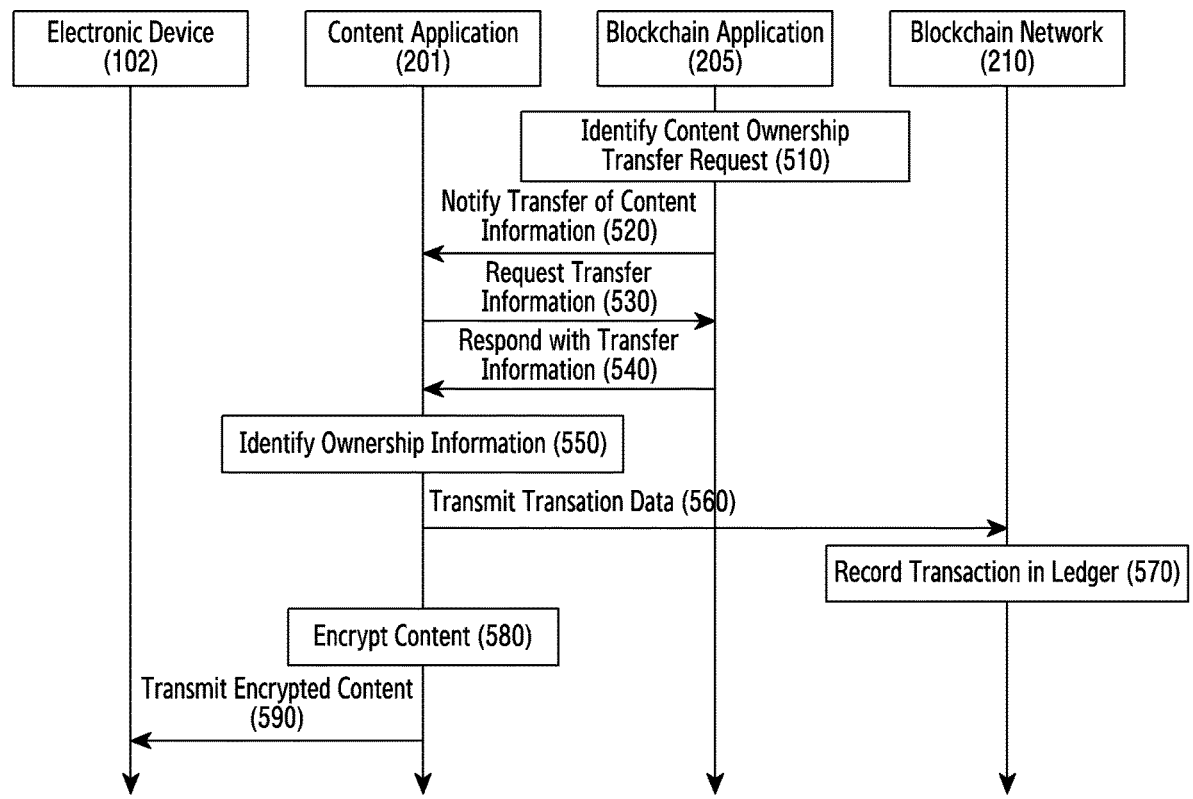
FIG. 5 is a flow chart illustrating a content transfer operation of an electronic device according to an embodiment of the disclosure.

FIG. 5 is a flow chart illustrating a content transfer operation of an electronic device according to an embodiment of the disclosure. Operations of FIG. 5 may be described with reference to the elements of FIG. 1 or 2.

Referring to FIG. 5, in operation 510, the blockchain application 205 may identify an ownership transfer request of the content 231. In an embodiment, the blockchain application 205 may identify an ownership transfer request of the content 231 through a user interface (UI) related to the blockchain application 205.

Referring to FIG. 5, in operation 520, the blockchain application 205 may notify ownership transfer of the content 231. In another embodiment, the blockchain application 205 may broadcast (e.g., intent) the ownership transfer of the content 231. In yet another embodiment, the blockchain application 205 may notify the ownership transfer of the content 231 to the content application 201.

Referring to FIG. 5, in operation 530, the content application 201 may request transform information to the blockchain application 205.

Referring to FIG. 5, in operation 540, the blockchain application 205 may provide the transfer information to the content application 201. In a yet another n embodiment, the transfer information may include information (e.g., an identity and a public key of a transferee) on a transferee of the content 231, information (e.g., an identity of a token related to the content 231 and an identity of the content 231) on the content 231, or a combination thereof.

Referring to FIG. 5, in operation 550, the content application 201 may identify ownership information of the content 231. In yet another embodiment, the content application 201 may identify the ownership information of the content 231 through operations 453, 455, 457, and 459 of FIG. 4. In an embodiment, the ownership information may include at least one of information enabling identification of an owner who owns the content 231 or information enabling identification of a user who will receive the transferred content 231 and own the same. For example, the ownership information includes an identity (e.g., a blockchain account (or address assigned to a transferor) of a transferor who owns the content 231. In another example, the ownership information includes an identity (e.g., a blockchain account (or address) assigned to a transferee) of a transferee who will receive the transferred ownership of the content 231. In another embodiment, the ownership information may further include a device identity. For example, the content application 201 receives an input of a device identity for identifying a device of a transferee through a graphical user interface.

Referring to FIG. 5, in operation 560, the content application 201 may transmit transaction data related to the ownership transfer of the content 231 to the blockchain network 210. In yet another embodiment, the content application 201 may transfer a transaction request to the blockchain application 205 to transmit the transaction data to the blockchain network 210. The blockchain application may transmit the transaction data to the blockchain network 210 as a response to the transaction request. In an embodiment, the content application 201 may make a signature on the transaction data through the blockchain application 205, and transmit the signed transaction data to the blockchain network 210. In an embodiment, in the transaction data related to the ownership transfer of the content 231, an identity (ID) of a token related to the content 231, an identity (ID) of a transferor, and an identity (ID) of a transferee may be recorded. In an embodiment, in the transaction data related to the ownership transfer of the content 231, an identity (ID) (e.g., an address) of the smart contract 221 related to the content 231 may be recorded.

Referring to FIG. 5, in operation 570, the blockchain network 210 may record the transaction data in the ledger 220. In yet another embodiment, the nodes 211 and 215 of the blockchain network 210 may record a transaction in the ledger 220, based on the transaction data. The content application 201 according to an embodiment may transfer a transaction request to the blockchain application 205 to record the transaction data in the ledger 220. The blockchain application 205 may transmit the transaction data to the blockchain network 210 in response to the transaction request.

Referring to FIG. 5, in operation 580, the content application 201 may encrypt the content 231. In an embodiment, the content application 201 may encrypt the content 231 by using a public key associated with the blockchain address of the transferee. In an embodiment, the content application 201 may encrypt the content 231, based on a token ownership proof response of the blockchain application 205.

In yet another embodiment, when the transaction data is recorded in the ledger, the content application 201 may encrypt the content 231.

Referring to FIG. 5, in operation 590, the content application 201 may transmit the encrypted content 231 to the electronic device 102 of the transferee.

Figure 6:
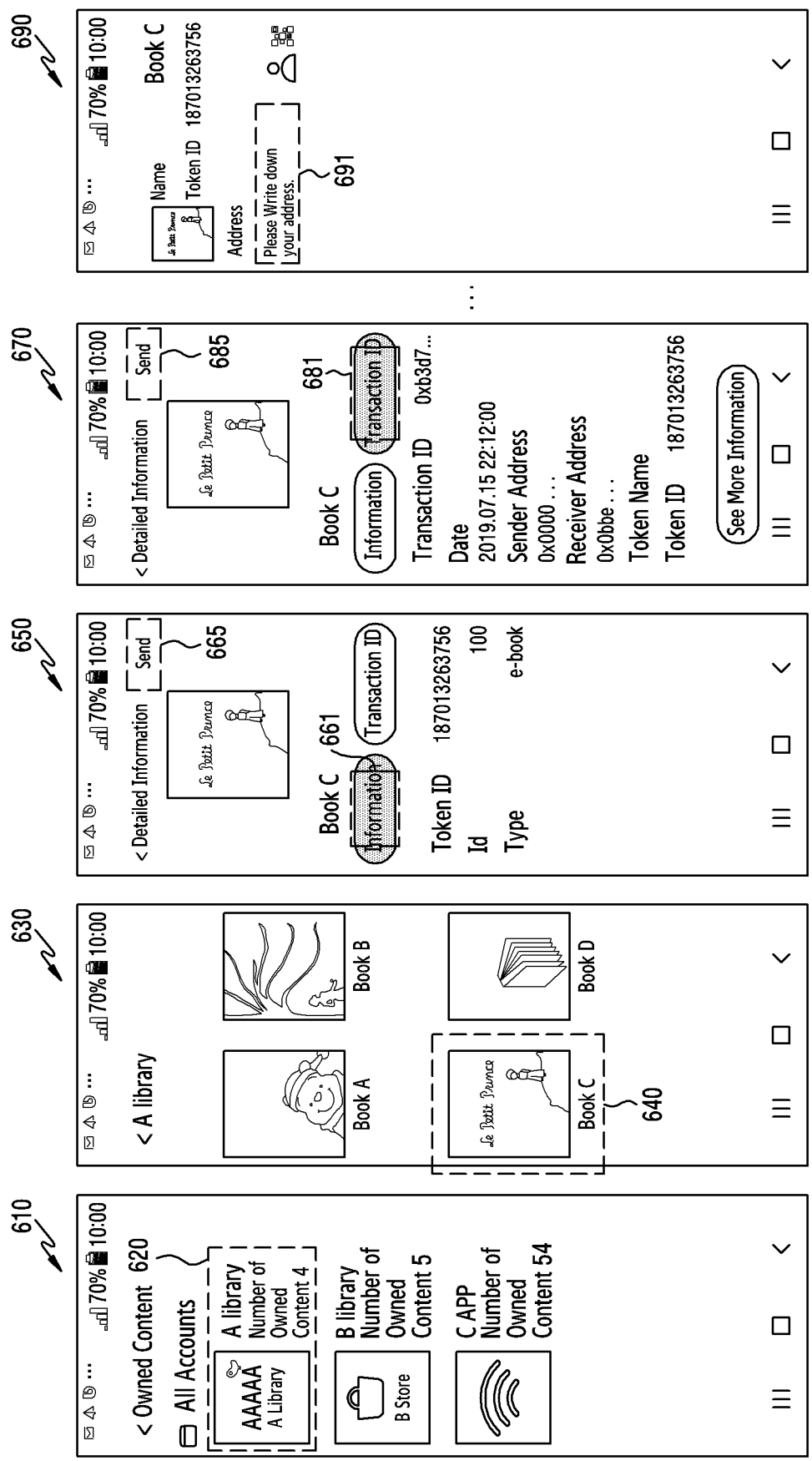
FIG. 6 illustrates a user interface an electronic device according to an embodiment of the disclosure.

FIG. 6 illustrates user interfaces 610, 630, 650, 670, and 690 of an electronic device 101 according to an embodiment of the disclosure. The user interface 610, 630, 650, 670, and 690 of FIG. 6 may be described with reference to the elements of FIG. 1 or 2.

The user interface 610, 630, 650, 670, and 690 of FIG. 6 may be user interfaces of the blockchain application 205.

Referring to FIG. 6, on the user interface 610, at least one icon indication at least one content application (e.g., "A library", "B Store", and "C App") may be displayed.

In an embodiment, a user may apply a first input 620 of selecting an icon on the user interface 610. In another embodiment, the blockchain application 205 may display the user interface 630 in response to the first input 620.

Referring to FIG. 6, on the user interface 630, at least one icon indicating contents (e.g., "Book C") related to "A library" may be displayed. In an embodiment, the contents related to "A library" may be contents which the user owns or purchases through "A library".

In yet another embodiment, to display the user interface 630 in response to the first input 620, the blockchain application 205 may request (e.g., operation 421 of FIG. 4) a content list from the blockchain network 210.

In yet another embodiment, the user may apply a second input 640 of selecting an icon indicating a content on the user interface 630. In an embodiment, the blockchain application 205 may display the user interface 650 or the user interface 670 in response to the second input 640. In an embodiment, the blockchain application 205 may display a user interface selected from among the user interface 650 and the user interface 670, in response to the second input 640. In an embodiment, the second input 640 may be an input for identifying detailed information of a content.

In yet another embodiment, the user may apply another input of selecting an icon indicating a content on the user interface 630. In an embodiment, the blockchain application 205 may request (e.g., operation 451 of FIG. 4) a content from the content application 201 in response to another input. In an embodiment, another input may be an input of using (reproducing) a content.

Referring to FIG. 6, on the user interface 650, information related to "Book C" may be displayed. In an embodiment, the information related to "Book C" may include information on a token identity (ID), a content identity, a content type, or a combination thereof.

In yet another embodiment, the user interface 650 may be displayed in response to the second input 640. In an embodiment, the user interface 650 may be displayed in response to an input of selecting an information tap 661.

Referring to FIG. 6, on the user interface 670, a transaction detail related to "Book C" may be displayed. In an embodiment, the transaction detail related to "Book C" may include a transaction identity (ID) (0xb3d7 . . . ), a transaction date (07.15.2019 22:12:00), a transferor address (0x0000 . . . ), a transferee address (0x0bbe . . . ), a token name, a token identity (ID) (187013263756), and a combination thereof. In an embodiment, the transaction identity (ID) may be an identity of a transaction that has been made. In an embodiment, the transaction identity (ID) maybe an identity of a transaction recorded in the ledger 220. In an embodiment, the token name may indicate a name of the smart contract 221 for managing the token.

In yet another embodiment, the user interface 670 may be displayed in response to the second input 640. In an embodiment, the user interface 670 may be displayed in response to an input of selecting a transaction detail tap 681.

In yet another embodiment, the user may apply a third input 665 for transferring a "Book C" content on the user interface 650. In an embodiment, the user may apply a fourth input 685 for transferring a "Book C" content on the user interface 670.

In yet another embodiment, the blockchain application 205 may display the user interface 690 in response to the input 665 or 685 for transferring the "Book C" content.

Referring to FIG. 6, the user interface 690 may include a transferee address input window 691.

In yet another embodiment, when an address of a transferee is input in the address input window 691 and a procedure for transferring the "Book C" content, the blockchain application 205 may notify (e.g., operation 520 of FIG. 5) the content application 201 of the content ownership transfer.

Figure 7:
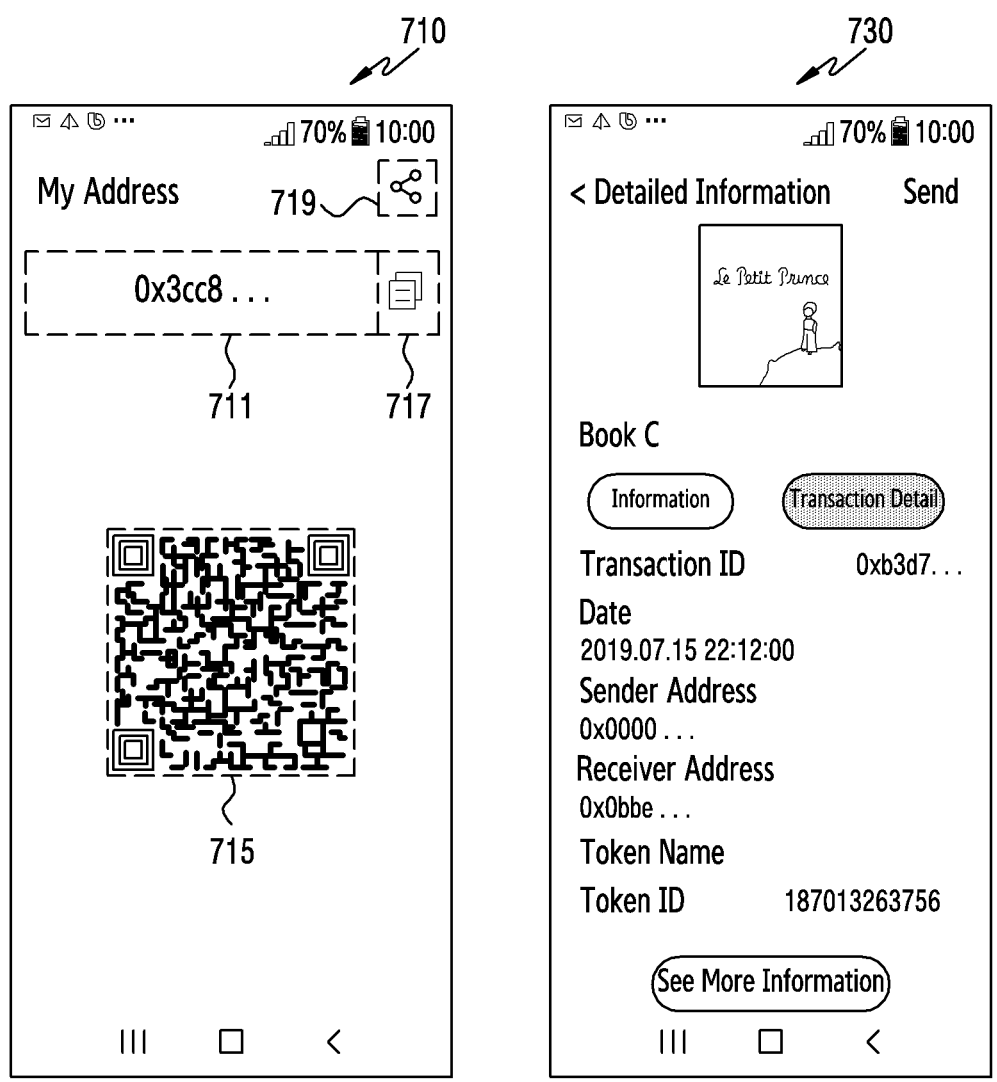
FIG. 7 illustrates a user interface of an electronic device according to an embodiment of the disclosure.

FIG. 7 illustrates user interfaces 710 and 730 of an electronic device 101 according to an embodiment of the disclosure. The user interfaces 710 and 730 of FIG. 7 may be described with reference to the elements of FIG. 1 or 2.

The user interfaces 710 and 730 of FIG. 7 may be user interfaces of the blockchain application 205.

The user interface 710 of FIG. 7 may be displayed in response to an input of selecting a receive button on the user interface 610 of FIG. 6.

Referring to FIG. 7, the user interface 710 may include an area 711 in which an identity (e.g., an address) of a user is displayed in text and an area 715 in which the identity (e.g., the address) of the user is displayed in a code (e.g., a quick response (QR) code).

In an embodiment, the user may copy the identity (e.g., the address) of the user through a copy button 717 of the user interface 710. In another embodiment, the copied identity (e.g., address) of the user may be provided to the electronic device 102 of another user through a messaging function (e.g., short message service (SMS)).

In yet another embodiment, the user may share the identity (e.g., the address) of the user to the electronic device 102 of another user through a share button 719 of the user interface 710.

In yet another embodiment, the electronic device 102 of another user may transfer ownership of a content, based on the identity (e.g., the address) of the user.

The user interface 730 of FIG. 7 may be a user interface displayed after the "Book C" content is transferred.

Referring to FIG. 7, compared to the user interface 670 of FIG. 6, a transaction detail related to "Book c" may be changed. In yet another embodiment, a transaction identity of the transaction detail related to "Book C" may be changed from 0xb3d7 . . . to 0xd24f . . . . In an embodiment, a transaction date of the transaction detail related to "Book C" may be changed from 07.15.2019 22:12:00 to 05.11.2020 15:13:12. In an embodiment, a transferor address of the transaction detail related to "Book C" may be changed from 0x0000 . . . to 0x0bbe . . . . In an embodiment, a transferee address of the transaction detail related to "Book C" may be changed from 0x0bbe . . . to 0x3cc8 . . . . In an embodiment, a token name and a token identity (187013263756) related to the transaction detail related to "Book C" may not be changed.

Figure 8:
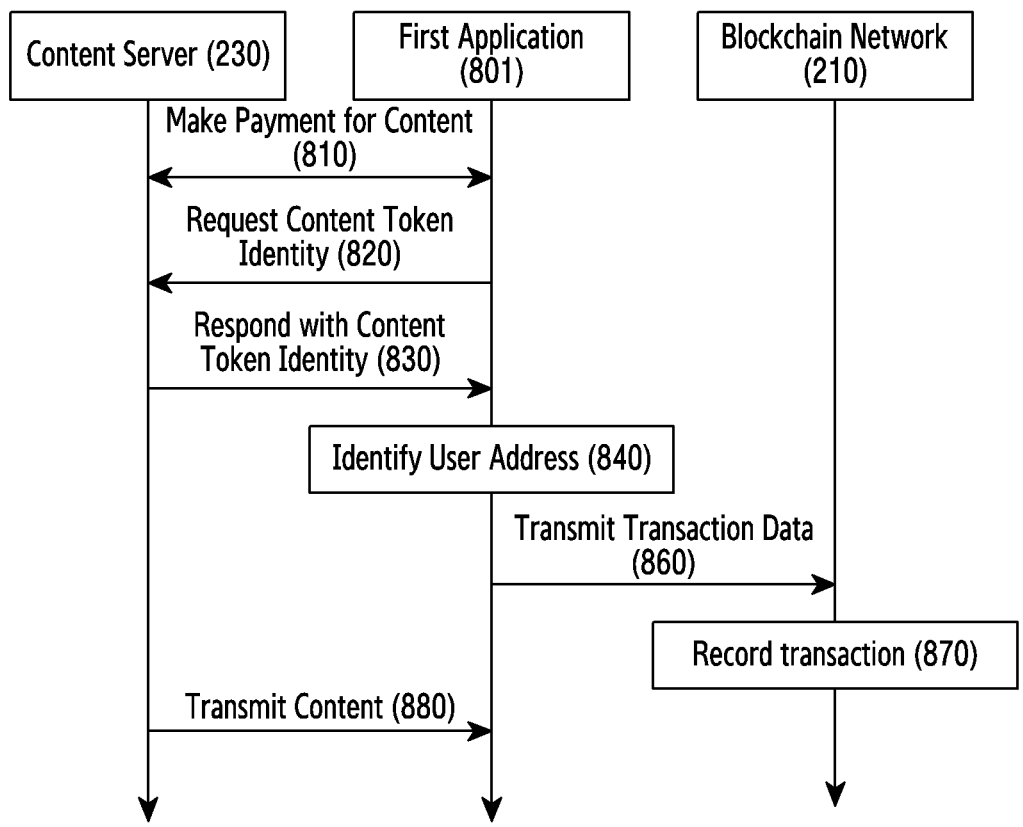
FIG. 8 is a flow chart illustrating a content purchase operation of an electronic device according to an embodiment of the disclosure.

FIG. 8 is a flow chart illustrating a content purchase operation of an electronic device 101 according to an embodiment of the disclosure. Operations of FIG. 8 may be described with reference to the elements of FIG. 1 or 2.

Compared to FIG. 3, 8 may show an example of performing a content purchase operation through an application 801. In an embodiment, the first application 801 may support a function of the content application 201 and a function of the blockchain application 205.

Referring to FIG. 8, in operation 810, a first application 801 may proceed with payment with the content server 230. In another embodiment, the first application 801 may proceed with payment for purchasing the content 231.

Referring to FIG. 8, in operation 820, the first application 801 may request an identity of a token related to the content 231 from the content server 230. In another embodiment, the token related to the content 231 may be a non-fungible token (NFT).

Referring to FIG. 8, in operation 830, the content server 230 may respond to the first application 801 with the identity of the token related to the content 231 in response to the request for the identity of the token related to the content 231.

Referring to FIG. 8, in operation 840, the first application 801 may identify a user address. In yet another embodiment, the user address may be a user address on the blockchain network 210.

Referring to FIG. 8, in operation 860, the first application 801 may transmit transaction data to the blockchain network 210. In yet another embodiment, the first application 801 may make a signature on the transaction data, and transmit the signed transaction data to the blockchain network 210. In an embodiment, the first application 801 may make a signature on the transaction data, based on a secret key (or a private key) related to an identity (ID) of a purchaser, and transmit the signed transaction data to the blockchain network 210.

Referring to FIG. 8, in operation 870, the blockchain network 210 may record the transaction data in the ledger 220. In yet another embodiment, the nodes 211 and 215 of the blockchain network 210 may record the transaction data in the ledger 220.

Referring to FIG. 8, in operation 880, the content server 230 may transmit the content 231 to the first application 801. In yet another embodiment, the content 231 may be a content encrypted based on a public key of the user.

Figure 9:
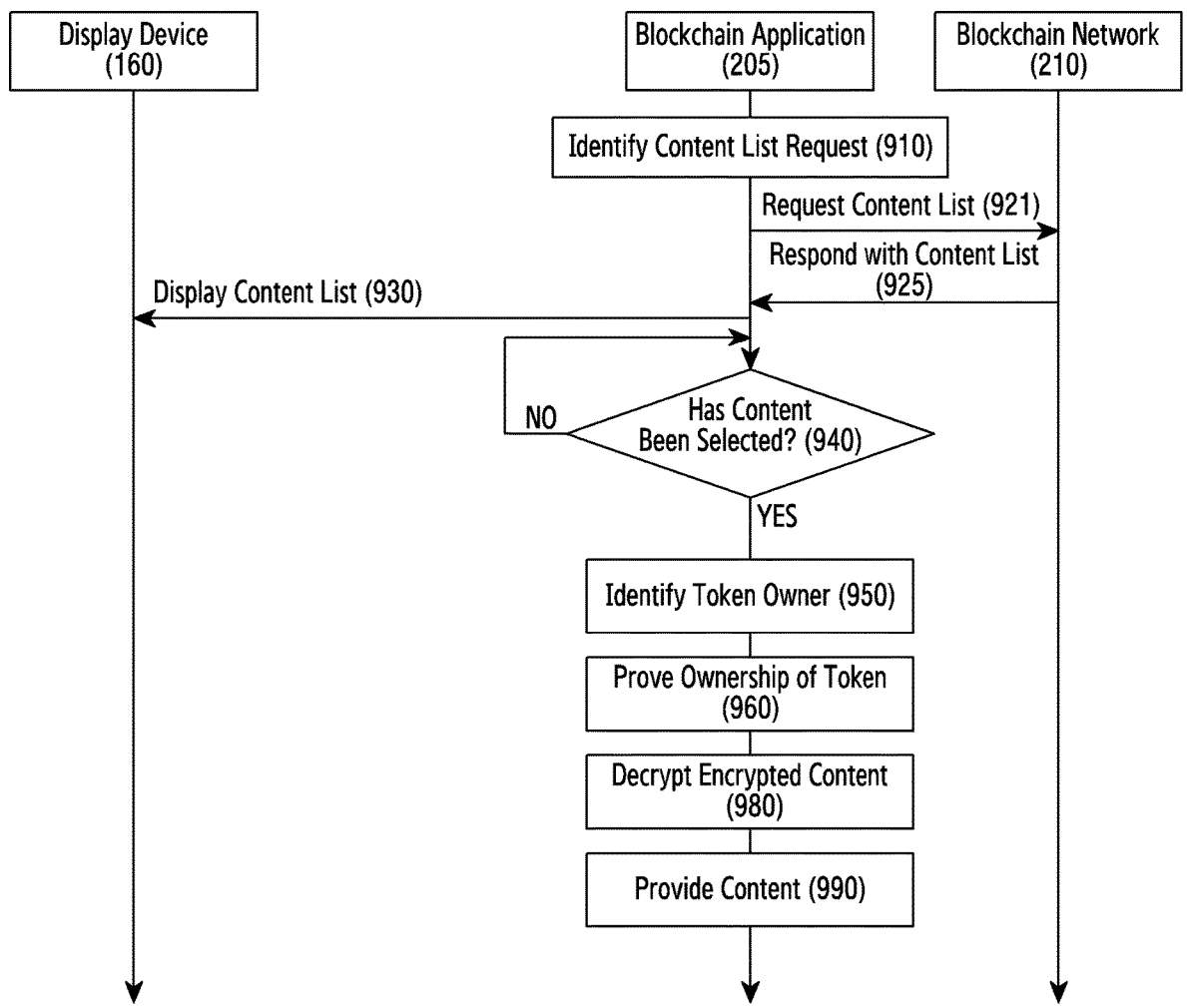
FIG. 9 is a flow chart illustrating a content provision operation of an electronic device according to an embodiment of the disclosure.

FIG. 9 is a flow chart illustrating a content provision operation of an electronic device according to an embodiment of the disclosure. Operations of FIG. 9 may be described with reference to the elements of FIG. 1 or 2.

Compared to FIG. 4, FIG. 9 may show an example of performing a content provision operation through an application 801. In yet another embodiment, a first application 801 may support a function of the content application 201 and a function of the blockchain application 205.

Referring to FIG. 9, in operation 910, the first application 801 may identify a content list request. In yet another embodiment, the first application 801 may identify a content list request through a user interface (UI) related to the first application 801.

Referring to FIG. 9, in operation 921, the first application 801 may request a content list from the blockchain network 210. In yet another embodiment, the content list may be a list including contents of non-fungible tokens owned by a user.

Referring to FIG. 9, in operation 925, the blockchain network 210 may respond to the first application 801 with the content list in response to the content list request. In yet another embodiment, the nodes 211 and 215 of the blockchain network 210 may respond to the first application 801 with the content list in response to the content list request.

Referring to FIG. 9, in operation 930, the first application 801 may display the content list by using the display device 160. In yet another embodiment, the first application 801 may display the content list through the user interface (UI) related to the first application 801.

Referring to FIG. 9, in operation 940, the first application 801 may identify whether the content has been selected. In yet another embodiment, the first application 801 may identify whether the content has been selected, based on an input (e.g., an input through the user interface). In an embodiment, the first application 801 may identify whether at least one of contents of the content list has been selected.

Referring to FIG. 9, in operation 940, when it is identified that the content has been selected, the first application 801 may operation 950. Referring to FIG. 9, when it is identified that the content has not been selected, the first application 801 may perform operation 940 again.

Referring to FIG. 9, in operation 950, when the content is selected, the first application 801 may identify an owner of the token.

In yet another embodiment, when the content is selected, the first application 801 may request identification of an owner of the token related to the content 231 from the blockchain network 210. In an embodiment, the blockchain network 210 may respond to the first application 801 with the identification of the owner of the token in response to the request for the identification of the owner of the token. In an embodiment, the blockchain network 210 may transmit a result of the identification of the owner of the token related to the content 231 to the first application 801.

Referring to FIG. 9, in operation 960, the first application 801 may prove ownership of the token related to the content 231.

In yet another embodiment, the first application 801 may make a signature on a designated character string through a secret key of a user. In an embodiment, the first application 801 may identify, based on the signed character string, whether the owner of the token related to the content 231 is the user.

Referring to FIG. 9, in operation 980, the first application 801 may decrypt the encrypted content 231. In yet another embodiment, the first application 801 may decrypt the encrypted content 231 by using a private key of the user.

Referring to FIG. 9, in operation 990, the first application 801 may provide the user with the decrypted content 231.

In yet another embodiment, when the content 231 is an electronic book, an image, or a video, the first application 801 may provide the user with the content 231 through the display device 160. In an embodiment, when the content 231 is a sound source, the first application 801 may provide the user with the content 231 through the audio module 170.

Figure 10:
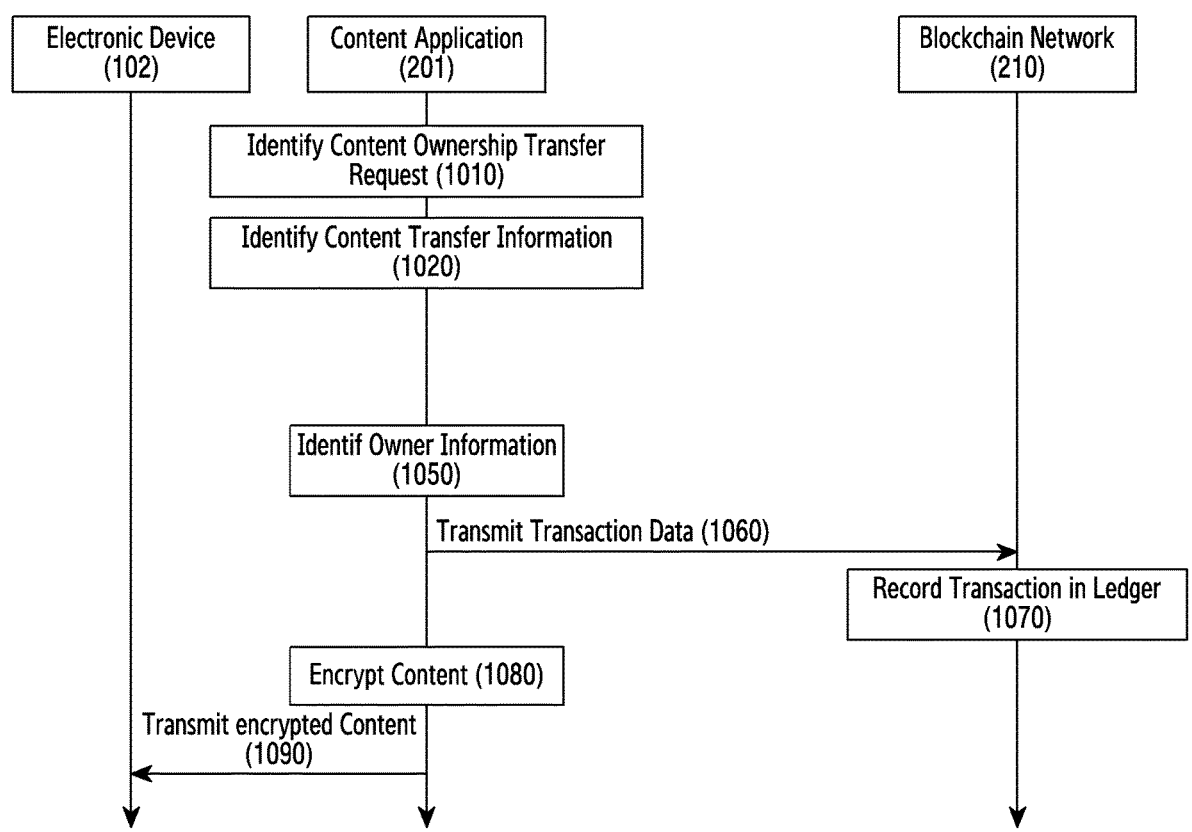
FIG. 10 is a flow chart illustrating a content transfer operation of an electronic device according to an embodiment of the disclosure.

FIG. 10 is a flow chart illustrating a content transfer operation of an electronic device according to an embodiment of the disclosure. Operations of FIG. 10 may be described with reference to the elements of FIG. 1 or 2.

Compared to FIG. 5, FIG. 10 may show an example of performing a content provision operation through an application 801. In an embodiment, a first application 801 may support a function of the content application 201 and a function of the blockchain application 205.

Referring to FIG. 10, in operation 1010, the first application 801 may identify an ownership transfer request of the content 231. In an embodiment, the first application 801 may identify an ownership transfer request of the content 231 through a user interface (UI) related to the first application 801.

Referring to FIG. 10, in operation 1020, the first application 801 may identify ownership transfer information of the content 231. In another embodiment, the transfer information may include information (e.g., an identity and a public key of a transferee) on a transferee of the content 231, information (e.g., an identity of a token related to the content 231 and an identity of the content 231) on the content 231, or a combination thereof.

Referring to FIG. 10, in operation 1050, the first application 801 may identify ownership information of the content 231. In yet another embodiment, the first application 801 may identify the ownership information of the content 231 through operations 950 and 960 of FIG. 9.

Referring to FIG. 10, in operation 1060, the first application 801 may transmit transaction data related to the ownership transfer of the content 231 to the blockchain network 210. In an embodiment, the first application 801 may make a signature on the transaction data, and transmit the signed transaction data to the blockchain network 210.

Referring to FIG. 10, in operation 1060, the blockchain network 210 may record the transaction data in the ledger 220. In yet another embodiment, the nodes 211 and 215 of the blockchain network 210 may record the transaction data in the ledger 220.

Referring to FIG. 10, in operation 1080, the first application 801 may encrypt the content 231. In yet another embodiment, the first application 801 may encrypt the content 231 by using a public key of a transferee. In an embodiment, the first application 801 may encrypt the content 231, based on a token ownership proof response of the first application 801.

In yet another embodiment, when the transaction data is recorded in the ledger, the first application 801 may encrypt the content 231.

Referring to FIG. 10, in operation 1090, the first application 801 may transmit the encrypted content 231 to the electronic device 102 of the transferee.

An electronic device according to yet another embodiment of the disclosure may include a communication module 190, a memory 130 configured to store instructions, and a processor 120, wherein the processor 120 is configured to execute the instructions to cause the electronic device 101 to identify owner information of a first content in response to a content ownership transfer request, transmit, to a blockchain network 210, transaction data for transferring ownership of the first content, based on the owner information of the first content, and transmit the first content to an external electronic device, and the transaction data corresponds to a transaction of transferring ownership of a token related to the first content.

In yet another embodiment, the token may be a non-fungible token.

In yet another embodiment, the processor 120 may be configured to execute the instructions to cause the electronic device 101 to encrypt the first content, based on a public key of a user of the external electronic device 102, and transmit the encrypted first content to the external electronic device 102.

In yet another embodiment, the processor 120 may be configured to execute the instructions to cause the electronic device 101 to request owner information of the token related to the first content from the blockchain network 210, receive the owner information of the token from the blockchain network 210, and in response to a fact that an owner of the token related to the first content is a user of the electronic device 101, prove ownership of the token, based on a secret key of the user.

In yet another embodiment, the processor 120 may be configured to execute the instructions to cause the electronic device 101 to perform signature on a designated character string, based on the secret key of the user, and verify a signed character string through a public key of a user to prove the ownership of the token.

In yet another embodiment, the processor 120 may be configured to execute the instructions to cause the electronic device 101 to transmit a content list request to the blockchain network 210, display the content list received from the blockchain network 210, and provide a user with a second content selected from among the content list that is being displayed, wherein the content list request transmitted to the blockchain network 210 includes an identity of a user, and the identity of the user indicates an address in the blockchain network 210.

In yet another embodiment, the processor 120 may be configured to execute the instructions to cause the electronic device 101 to decrypt the second content by using a secret key of the user, and provide the user with the decrypted second content.

In yet another embodiment, the processor 120 may be configured to execute the instructions to cause the electronic device 101 to transmit the first content to the external electronic device 102 after the transaction data is recorded in the blockchain network.

In yet another embodiment, the processor 120 may be configured to execute the instructions to cause the electronic device 101 to transmit the first content to the external electronic device 102 and then delete the first content from the memory 130.

In yet another embodiment, the transaction data may include an identity of the content, an identity of the token related to the content, an identity of a transferee, and an identity of a transferor.

An operation method of an electronic device 101 according to an embodiment of the disclosure may include identifying owner information of a first content in response to a content ownership transfer request, transmitting, to a blockchain network 210, transaction data for transferring ownership of the first content, based on the owner information of the first content, and transmitting the first content to an external electronic device 102, wherein the transaction data corresponds to a transaction of transferring ownership of a token related to the first content.

In yet another embodiment, the token may be a non-fungible token.

In yet another embodiment, the transmitting of the first content to the external electronic device 102 may include encrypting the first content, based on a public key of a user of the external electronic device 102, and transmitting the encrypted first content to the external electronic device 102.

In yet another embodiment, the transmitting of the transaction data to the blockchain network 210 may include requesting owner information of the token related to the first content from the blockchain network 210, receiving the owner information of the token from the blockchain network 210, and in response to a fact that an owner of the token related to the first content is a user of the electronic device 101, proving ownership of the token, based on a secret key of the user.

In yet another embodiment, the proving of the ownership of the token may include performing signature on a designated character string, based on the secret key of the user, and verifying a signed character string through a public key of a user to prove the ownership of the token.

In an embodiment, the transmitting of the content list request to the blockchain network 210 may include displaying the content list received from the blockchain network 210, and providing a user with a second content selected from among the content list that is being displayed, wherein the content list request transmitted to the blockchain network 210 includes an identity of a user, and the identity of the user indicates an address in the blockchain network 210.

In yet another embodiment, the providing of the second content to the user may include decrypting the second content by using a secret key of the user, and providing the user with the decrypted second content.

In yet another embodiment, the transmitting of the first content to the external electronic device 102 may include transmitting the first content to the external electronic device 102 after the transaction data is recorded in the blockchain network 210.

In yet another embodiment, the method may include transmitting the first content to the external electronic device 102 and then deleting the first content from the memory 130.

In yet another embodiment, the transaction data may include an identity of the content, an identity of the token related to the content, an identity of a transferee, and an identity of a transferor.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   communication circuitry;
   memory, comprising one or more storage media, storing instructions; and
   at least one processor communicatively coupled to the communication circuitry and the memory,
   wherein the instructions, when executed by the at least one processor individually or collectively, cause the electronic device to:
      identify owner information of a first content in response to a content ownership transfer request,
      transmit, via the communication circuitry to at least one node among a plurality of nodes of a blockchain network, transaction data for transferring ownership of the first content, based on the owner information of the first content, and
      based on identifying a transferee, encrypt and transmit via the communication circuitry to an external electronic device the first content, based on a public key associated with a blockchain address of the transferee included in transfer information corresponding to the content ownership transfer request, and
   wherein the transaction data corresponds to data relating to a transaction of transferring ownership of a token related to the first content to the transferee.

2. The electronic device of claim 1, wherein the token is a non-fungible token.

3. The electronic device of claim 1, wherein the instructions, when executed by the at least one processor individually or collectively, cause the electronic device to acquire the public key by using the blockchain address included in the transfer information.

4. The electronic device of claim 1, wherein the instructions, when executed by the at least one processor individually or collectively, cause the electronic device to:
   request owner information of the token related to the first content from the at least one node among the plurality of nodes of the blockchain network,
   receive the owner information of the token from the at least one node among the plurality of nodes of the blockchain network, and
   in response to a fact that an owner of the token related to the first content is a user of the electronic device, prove ownership of the token, based on a secret key of the user.

5. The electronic device of claim 4, wherein the instructions, when executed by the at least one processor individually or collectively, cause the electronic device to:
   perform signature on a designated character string, based on the secret key of the user, and
   verify a signed character string through a public key of a user to prove the ownership of the token.

6. The electronic device of claim 1,
   wherein the instructions, when executed by the at least one processor individually or collectively, cause the electronic device to:
      transmit a content list request to the at least one node among the plurality of nodes of the blockchain network,
      display a content list received from the at least one node among the plurality of nodes of the blockchain network, and
      provide a user with a second content selected from among the content list that is being displayed,
   wherein the content list request transmitted to the at least one node among the plurality of nodes of the blockchain network comprises an identity of a user, and
   wherein the identity of the user indicates an address in the blockchain network.

7. The electronic device of claim 6, wherein the instructions, when executed by the at least one processor individually or collectively, cause the electronic device to:
   decrypt the second content by using a secret key of the user, and
   provide the user with the decrypted second content.

8. The electronic device of claim 1, wherein the instructions, when executed by the at least one processor individually or collectively, cause the electronic device to transmit the first content to the external electronic device after the transaction data is recorded in the blockchain network.

9. The electronic device of claim 1, wherein the instructions, when executed by the at least one processor individually or collectively, cause the electronic device to delete the first content from the memory after transmitting the first content to the external electronic device.

10. The electronic device of claim 1, wherein the transaction data comprises an identity of the first content, an identity of the token related to the first content, an identity of the transferee, and an identity of a transferor.

11. A method performed by an electronic device, the method comprising:
   identifying, by the electronic device, owner information of a first content in response to a content ownership transfer request;
   transmitting, by the electronic device to at least one node among a plurality of nodes of a blockchain network, transaction data for transferring ownership of the first content, based on the owner information of the first content; and
   based on identifying a transferee, encrypting and transmitting, by the electronic device to an external electronic device, the first content, based on a public key associated with a blockchain address of the transferee included in transfer information corresponding to the content ownership transfer request, wherein the transaction data corresponds to data relating to a transaction of transferring ownership of a token related to the first content to the transferee.

12. The method of claim 11, wherein the token is a non-fungible token.

13. The method of claim 11, wherein the encrypting of the first content comprises acquiring the public key by using the blockchain address included in the transfer information.

14. The method of claim 11, wherein the transmitting of the transaction data to the at least one node among the plurality of nodes of the blockchain network comprises:
   requesting owner information of the token related to the first content from the at least one node among the plurality of nodes of the blockchain network;
   receiving the owner information of the token from the at least one node among the plurality of nodes of the blockchain network; and
   in response to a fact that an owner of the token related to the first content is a user of the electronic device, proving ownership of the token, based on a secret key of the user.

15. The method of claim 14, wherein the proving of the ownership of the token comprises:
   performing signature on a designated character string, based on the secret key of the user; and
   verifying a signed character string through a public key of a user to prove the ownership of the token.

16. The method of claim 11, further comprising:
   transmitting a content list request to the at least one node among the plurality of nodes of the blockchain network;
   displaying a content list received from the at least one node among the plurality of nodes of the blockchain network; and
   providing a user with a second content selected from among the content list that is being displayed,
   wherein the content list request transmitted to the at least one node among the plurality of nodes of the blockchain network comprises an identify of a user, and
   wherein the identity of the user indicates an address in the blockchain network.

17. The method of claim 16, wherein providing a user with the second content comprises:
   decrypting the second content by using a secret key of the user, and
   providing the user with the decrypted second content.

18. The method of claim 11, the transmitting the first content to the external electronic device comprises transmitting the first content to the external electronic device after the transaction data is recorded in the blockchain network.

19. The method of claim 11, further comprising:
   deleting the first content from a memory after transmitting the first content to the external electronic device.

20. The method of claim 11, wherein the transaction data comprises an identity of the first content, an identity of the token related to the first content, an identity of the transferee, and an identity of a transferor.

\* \* \* \* \*